(12) United States Patent
Gamliel et al.

(10) Patent No.: US 11,765,043 B2
(45) Date of Patent: Sep. 19, 2023

(54) DATA DRIVEN CHAOS ENGINEERING BASED ON SERVICE MESH AND ORGANIZATIONAL CHART

(71) Applicant: Dell Products, L.P., Round Rock, TX (US)

(72) Inventors: Roi Gamliel, Moshav Tkuma (IL); Avitan Gefen, Tel Aviv (IL); Joseph LaSalle White, San Jose, CA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

(21) Appl. No.: 17/193,940

(22) Filed: Mar. 5, 2021

(65) Prior Publication Data

US 2022/0286362 A1   Sep. 8, 2022

(51) Int. Cl.
*H04L 41/14* (2022.01)
*G06F 16/901* (2019.01)

(52) U.S. Cl.
CPC ........ *H04L 41/145* (2013.01); *G06F 16/9024* (2019.01)

(58) Field of Classification Search
CPC ............................ H04L 41/145; G06F 16/9024
See application file for complete search history.

(56) References Cited

U.S. PATENT DOCUMENTS

| | | | |
|---|---|---|---|
| 9,491,035 B1 | 11/2016 | Pauley et al. | |
| 2012/0265569 A1* | 10/2012 | Gonzalez-Diaz | ............................ G06Q 10/0631 705/7.12 |
| 2014/0074545 A1* | 3/2014 | Minder | .............. G06Q 10/0633 705/7.27 |
| 2014/0101168 A1* | 4/2014 | Bayliss | ................. G06F 16/215 707/748 |
| 2017/0123604 A1* | 5/2017 | Kone | ..................... G06T 11/206 |
| 2018/0069806 A1* | 3/2018 | Kumar | ................... H04L 47/827 |
| 2018/0082240 A1* | 3/2018 | Meyerzon | ...... G06Q 10/063112 |
| 2018/0174104 A1 | 6/2018 | Schikora et al. | |
| 2019/0188049 A1 | 6/2019 | Choudhary et al. | |
| 2019/0347668 A1 | 11/2019 | Williams et al. | |
| 2020/0160190 A1 | 5/2020 | Swamy et al. | |
| 2020/0236009 A1 | 7/2020 | Meyer et al. | |
| 2020/0371896 A1 | 11/2020 | Mathur et al. | |
| 2021/0124577 A1* | 4/2021 | Gupta | ................. G06F 9/45533 |
| 2021/0150056 A1 | 5/2021 | Vax et al. | |

(Continued)

OTHER PUBLICATIONS

Wikipedia | Centrality, https://en.wikipedia.org/wiki/Centrality, retrieved Feb. 2, 2021, 15 pages.

(Continued)

*Primary Examiner* — Oleg Survillo
*Assistant Examiner* — Monishwar Mohan
(74) *Attorney, Agent, or Firm* — Amin, Turocy & Watson, LLP

(57) ABSTRACT

An organizational graph and a microservice graph can be generated. For two neighboring microservices, a combined organizational distance can be determined based on a distance for respective workers of each microservice in the organizational graph. The combined organizational distance can be used to determine a priority for a connection between the two microservices, and chaos testing can be performed on that connection based on its priority.

20 Claims, 12 Drawing Sheets

(56) References Cited

U.S. PATENT DOCUMENTS

| | | |
|---|---|---|
| 2021/0152659 A1 | 5/2021 | Cai et al. |
| 2021/0182069 A1 | 6/2021 | Upadhyaya |
| 2021/0216444 A1* | 7/2021 | Gefen ................. G06F 11/3688 |
| 2022/0180215 A1 | 6/2022 | Kumar |
| 2022/0191168 A1 | 6/2022 | Snehashis et al. |
| 2023/0015670 A1 | 1/2023 | Wolpoff et al. |

OTHER PUBLICATIONS

Wikipedia | Conways' Law, https://en.wikipedia.org/wiki/Conway%27s_law, retrieved Feb. 2, 2021, 2 pages.
Wikipedia | Modular programming, https://en.wikipedia.org/wiki/Modular_programming, retrieved Feb. 2, 2021, 3 pages.
Burgan, Darrel | Microservices and Conway's Law, https://dzone.com/articles/microservices-and-conways-law, retrieved Feb. 2, 2021, 4 pages.
Github | About code owners, https://docs.github.com/en/github/creating-cloning-and-archiving-repositories/about-code-owners#about-code-owners, retrieved Feb. 2, 2021, 4 pages.
Office Action dated Oct. 15, 2021 for U.S. Appl. No. 17/086,540, 33 pages.
MacDonald, Andy. "Chaos Engineering: Chaos Testing Your HTTP Micro-Services—Failing to Succeed and Succeeding at Failing" Medium. May 20, 2019. Published online at [https://betterprogramming.pub/chaos-engineering-chaos-testing-your-http-micro-services-acc99d145515], retrived Jan. 30, 2022, 8 pages.
Notice of Allowance dated Feb. 11, 2022 for U.S. Appl. No. 17/086,540, 19 pgs.
Office Action dated Apr. 13, 2023 for U.S. Appl. No. 17/164,036, 34 pages.

* cited by examiner

DATA DRIVEN CHAOS ENGINEERING BASED ON SERVICE MESH AND ORGANIZATIONAL CHART

BACKGROUND

Microservices can generally be a variant of a service-oriented architecture (SOA) computer architectural style that structures an application as a collection of loosely coupled services. A benefit of decomposing an application into different, smaller services can be that it can improve modularity and make an application easier to understand, develop, and test. Such an approach can also parallelize development by permitting small, autonomous teams to develop, deploy, and scale their respective services independently. It is possible that each microservice of a system is developed and deployed independently—perhaps hundreds of times a day. Furthermore, microservices can be polyglot, and developed using different technology stacks (e.g., a programming language, and measured persistent technology).

Microservices can be deployed as part of a software as a service (SaaS) model, where a system of microservices is centrally hosted, is accessed by a thin client (e.g., a web browser), and is expected to be operational at all times. Operational up time can be measured by availability. Availability can be a measure of a system that identifies whether a user is able to use the service when he needs to use it. In SaaS architectures, availability can be measured by uptime, to which 99.999% ("five 9s") uptime is aspired.

As to organizations of people that develop and maintain microservices, "Conway's law" states that, "Any organization that designs a system (defined broadly) will produce a design whose structure is a copy of the organization's communication structure." An underpinning of this idea is that, in order for software to function properly, multiple authors will likely communicate with each other to create it. Given that, a software interface can reflect social boundaries of an organization the produces the software, where communication across these boundaries is more difficult than communication within the organization.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
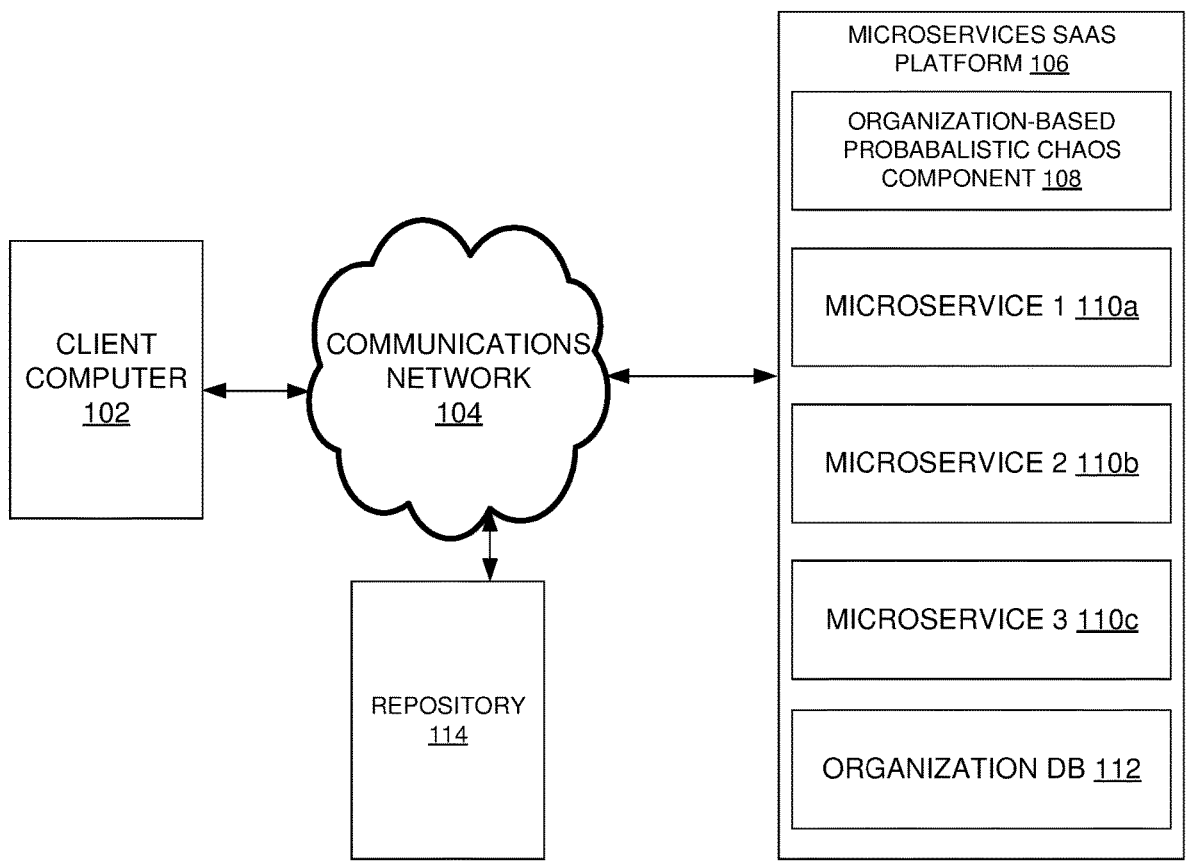
FIG. 1 illustrates an example system architecture that can facilitate data-driven chaos engineering based on a service mesh and an organizational chart, in accordance with certain embodiments of this disclosure.

The present application relates generally to analyzing inter-related microservices and a structure of development teams that build and maintain those microservices.

An aim when developing a SaaS system can be to increase availability by reliability. Availability can be considered to be (uptime)/(uptime+downtime). Availability can also be considered to be (mean time to failure/mean time between failures)=(mean time to failure)/(mean time to diagnose+mean time to repair+mean time to failure).

This ratio can be increased by increasing mean time to failure, or by decreasing mean time to diagnose and/or mean time to repair. In a traditional product environment, a traditional approach is to increase mean time to failure. In some examples, mean time to diagnose can always be high (e.g., a customer first has to discover the error, then will likely try to fix it himself, then will raise a support call, the support call is escalated to engineering, etc.), and can be outside of a service provider's control. Mean time to repair can be minimized, but usually involves at least producing a fix, testing the fix, providing the fix to support, support providing the fix to the customer, and the customer applying the fix. Because of these high costs associated with mean time to diagnose and mean time to repair, an attempt can be made to minimize failures (and hence mean time to failure) through extensive checks and balances on products that are shipped to customers.

In contrast to a traditional product environment, with a SaaS environment, this equation can change. With proper operations monitoring in place, mean time to diagnose can be measured in minutes instead of days. Since SaaS can be a single-instance deployment, a viable approach can be to quickly assemble a replacement software service (e.g., a database, a configuration setting, or computer-executable code) to reduce mean time to repair. In some examples, a failure can be fixed without someone external noticing that there was a problem.

That is, in a SaaS environment there can be less pressure to reduce mean time to failure, because a (mean time to failure):(mean time between failure) ratio can be kept high by improving mean time between failure. This can be in contrast to increasing mean time to failure, where overheads and costs of increasing mean time to failure can impede an ability to accomplish things, which can cause an administrator to become risk averse and afraid to change anything in the system.

An approach to creating a low mean time to repair can involve utilizing disciplines such as chaos testing. In a microservices environment, tracking and monitoring potentially hundreds of microservices developed by different teams can introduce lots of complexity. There can be automatic intelligent tools that help reduce risk and help a quality assurance (QA) approach.

In some examples of a microservices architecture where different workers in an organization are responsible for different microservices, a greater distance between two workers in an organizational chart can lead to increased challenges in cooperation and increased chances for miscommunication. Different processes, motivation, culture, methodologies, and/or naming conventions for one idea can appear. In a microservices architecture where changes can happen rapidly, neighboring microservices (where one microservice sends information to another microservice) whose corresponding workers are far apart in an organizational graph can be a weak link in the system architecture.

An approach to a quality assurance of a microservice system architecture can involve chaos testing. Chaos testing can generally comprise a discipline of experimenting on a computer system in order to build confidence in the system's capability to withstand turbulent and unexpected conditions. Chaos testing can be implemented to create continuous, random, or systematic failures to a system, and then test the ability of the system to overcome these failures.

The present techniques can provide for improving a quality assurance approach by prioritizing where failures should be applied through analyzing a microservices architecture and a corresponding organizational structure. Graphical analysis can be performed over a service mesh graph for microservices, and automatic detection of code ownership can be used to identify where there is a large organizational distance between workers responsible for close microservices.

According to one or more embodiments of the present techniques, a quality assurance process can be improved by prioritizing where failures should be applied, where the prioritization is made through analyzing the system's service mesh. In some examples, graphical analysis over application programming interface (API) dependencies in a microservice environment can be performed in conjunction with automated detection of code ownership to identify where to apply failures as part of chaos testing. Examples of these approaches can reduce mean time to repair, this lowering a time it takes a SaaS system to recover from a failure.

A chaos test can generally comprise applying a random test to a system (e.g., causing a microsystem not to respond), followed by assessing a set of assertions about the state of the system after the random test. A chaos test can be considered to succeed (e.g., the system operates properly despite the chaos) where all assertions succeed, and can be considered to fail (e.g., the system does not sufficiently operate properly due to the chaos) where at least one of the assertions fails.

The present techniques can be utilized to reduce a number of working hours for engineers by permitting them to focus more on implementation and development, and less on bug fixes. A faster time to production and a faster feature development of simpler and less-buggy code can improve resulting products. According to the present techniques, an ability to release new features faster and react faster to customer requests can elevate customer experience and satisfaction. The present techniques can be implemented to lower a mean time to diagnose of a system.

A structure of API dependencies between microservices can be generated. One approach can involve generating a service mesh graph. A service mesh can describe a network of microservices that make up a distributed application and the interactions between those microservices.

An organization structure can generally comprise a network of hierarchies where workers are connected to those who they report to. This structure can show a flow of motivation that comes from management, as well as the organizational distance between different workers. The network structure can be augmented with information such as geographical or site location, language, and more. An organizational graph structure can represent the organization and interrelations between workers. A directed edge (u,v) in the organizational graph can represent the fact that worker v reports to worker u.

To determine which worker owns which microservice, a node of a worker in an organizational graph can be mapped to a microservice that worker is working on in a service mesh.

Computer code for a microservice can be maintained using version control tools and management tools, which can be utilized to identify code owners. Management tools can be utilized to determine one or more code owners for a microservice. From this, for each worker, a set of microservices owned by that worker can be generated. In some examples, one worker can map to multiple microservices.

An organizational distance between two workers (org-distance(w1, w2)) can be considered to be a length of a shortest undirected path from worker w1 to worker w2 in the organizational graph.

Using organizational distance, fragile links in a microservices architecture can be identified. A fragile link can generally comprise a link between two microservices that have a producer-consumer relationship (sometimes referred to as neighboring microservices), where the contributors to one of these two microservices have a large organizational distance from the contributors to the other of these two microservices. This organizational distance can cause misalignment, and therefore the link can be considered to be fragile.

An approach for determining a fragility score can be:
For each pair of microservices ($M_{n1}$, $M_{n2}$) that are neighbors in a service mesh graph
    For each pair of workers ($w_i$, $w_j$), where $w_i$ is a worker for $M_{n1}$ and $w_j$ is a worker for $M_{n2}$, determine the organizational distance
        Take a combined organizational distance for ($M_{n1}$, $M_{n2}$)

This approach can be used to determine a combined organizational distance (which can be an average of the individual organizational distances of two workers), and then use this metric as a weight that represents fragility in chaos testing.

For applying chaos in chaos testing it can be that, the more fragile an edge $e=(M_i, M_j)$ in a service mesh graph, the more likely that failure will be determined to be applied on e. After selecting an edge, failure can be applied to that edge, and then a set of assertions can be run to determine how the system is performing after that failure.

In some examples where there is limited time to apply chaos, an edge with a highest fragility score can be selected for chaos. In other examples where there is more time to run chaos, an approach such as the following can be selected to choose an edge for each of multiple rounds:

While time<threshold
    select an edge based on the respective probabilities
    apply failure to the selected edge and run a chaos test Several approaches can be used to assign a probability to an edge based on its fragility score. For example, the weights of edges can be normalized from fragility scores, and this normalized value can be used as a probability. Take edges (e1, e2) with weights (2, 1). After normalization, the weights can be (⅔, ⅓), meaning that edge e1 will be chosen ⅔ of the time, while edge e2 will be chosen ⅓ of the time. Another approach can be to utilize an exponential decay function (with some chosen constants) to assign a probability to choosing a particular edge. These numbers from an exponential decay function can be normalized.

These techniques can provide for focusing chaos testing on the likely weakest links in a set of service dependencies because these are the most likely places for defects to occur, according to Conway's law.

In some examples, the present techniques can be used on premises, or as a cloud-based offering.

Example Architectures

FIG. 1 illustrates an example system architecture 100 that can facilitate data-driven organization adjustment, in accordance with certain embodiments of this disclosure.

As depicted, system architecture 100 comprises client computer 102, communications network 104, microservices SaaS platform 106, and repository 114. In turn, microservices SaaS platform 106 comprises organization-based probabilistic chaos component 108, microservice 1 110*a*, microservice 2 110*b*, microservice 3 110*c*, and organization database 112.

Figure 12:
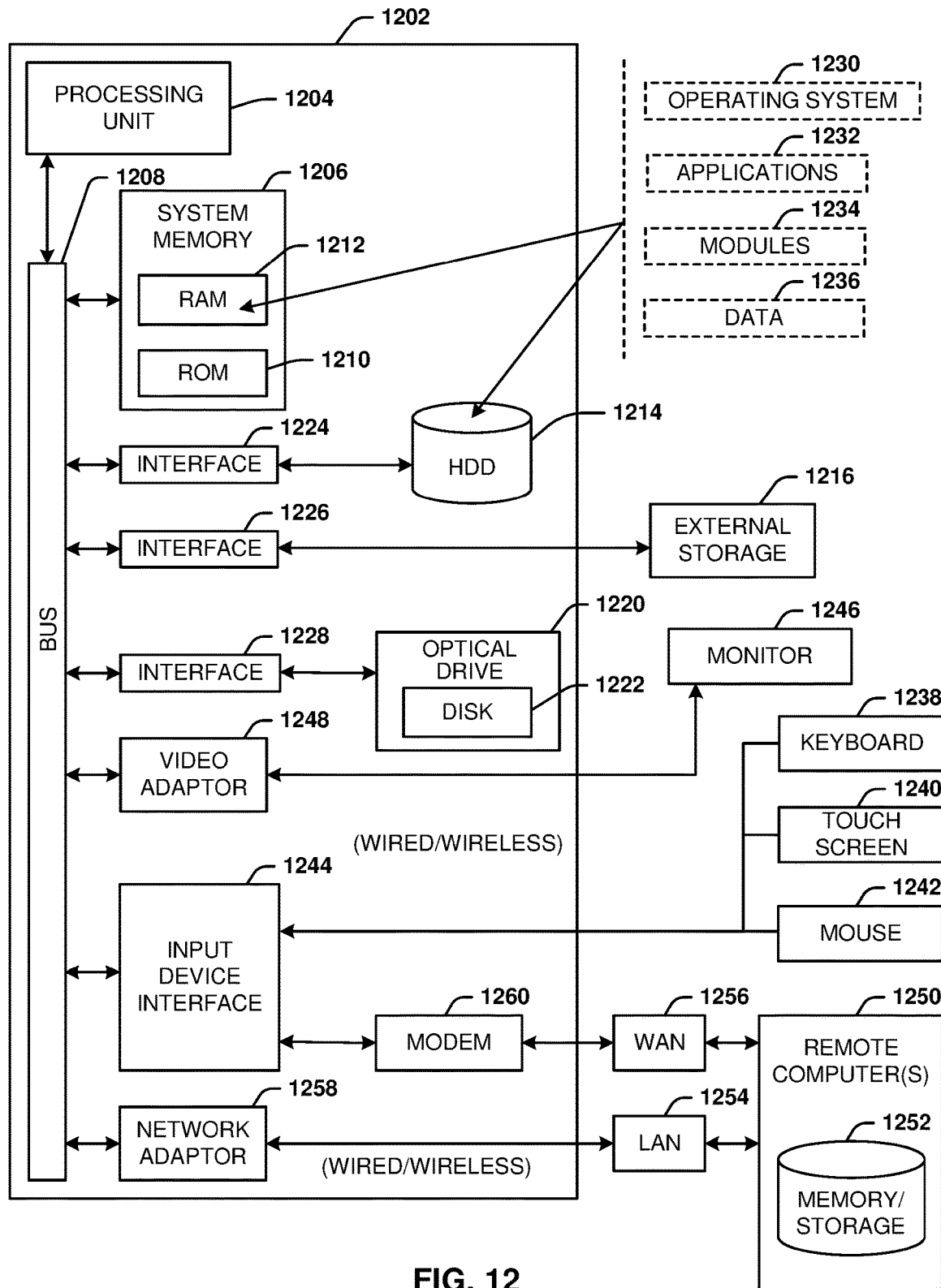
FIG. 12 illustrates an example block diagram of a computer operable to execute certain embodiments of this disclosure.

Each of client computer 102, microservices SaaS platform 106, and repository 114 can be implemented with one or more instances of computer 1202 of FIG. 12. In some examples, microservices SaaS platform 106 comprises a distributed storage system that comprises multiple instances of computer 1202 of FIG. 12. In some examples, each of organization-based probabilistic chaos component 108, microservice 1 110*a*, microservice 2 110*b*, microservice 3 110*c*, and organization database 112 can be implemented with machine-executable instructions and/or part(s) of computer 1202 of FIG. 12.

Communications network 104 can comprise a computer communications network, such as the INTERNET, or an isolated private computer communications network.

Client computer 102 can access microservices SaaS platform 106 via communications network 104. In some examples, client computer 102 can access computer storage resources provided as SaaS by microservices SaaS platform 106. Microservices SaaS platform 106 can provide this SaaS via microservice 1 110*a*, microservice 2 110*b*, and microservice 3 110*c* working in conjunction, similar to system architecture 200 of FIG. 2.

Repository 114 can store one or more code repositories that correspond to a microservice on microservices SaaS platform 106 (e.g., microservice 1 110*a*). A code repository can comprise compiled and/or uncompiled computer code that is used to create a corresponding microservice. Each separate project on repository 114 (e.g., one for microservice 1 110*a*, and another for microservice 2 110*b*) can be referred to as a repository.

Organization-based probabilistic chaos component 108 can be used to identify where to introduce chaos testing in the microservices of SaaS platform 106. In some examples, organization-based probabilistic chaos component 108 can introduce chaos in particular microservices or connections between microservices.

In some examples, organization-based probabilistic chaos component 108 can analyze the interaction of microservice 1 110*a*, microservice 2 110*b*, and microservice 3 110*c*; who in an organization is associated with each of microservice 1 110*a*, microservice 2 110*b*, and microservice 3 110*c* from repository 114; and the organization as it currently exists from organization database 112.

From this analysis, organization-based probabilistic chaos component 108 can identify where to introduce chaos, such as by causing a failure condition in the connection between two microservices. In some examples, organization-based probabilistic chaos component 108 can weight where to introduce chaos between two microservices based on workers who manage the respective microservices being relatively far from each other in the organization's organizational chart.

Organization-based probabilistic chaos component 108 can introduce chaos to a microservices architecture in a variety of ways, including introducing chaos to a connection between two microservices. Introducing chaos to a connection between two microservices can include changing a configuration of one or more proxies (or "sidecars") that connects two microservices, so that the two microsystems' communications are inhibited or halted. Introducing chaos to a connection between two microservices can also comprise disabling or making unavailable for some amount of time one or both of the microservices. Introducing chaos to a connection between two microservices can also comprise slowing a bandwidth of the connection. Introducing chaos to a connection between two microservices can also comprise introducing a mistake in a message or API content between the two microservices, in the setup or maintenance of the two microservices and their connection, and/or in message handling between the two microservices.

Figure 6:
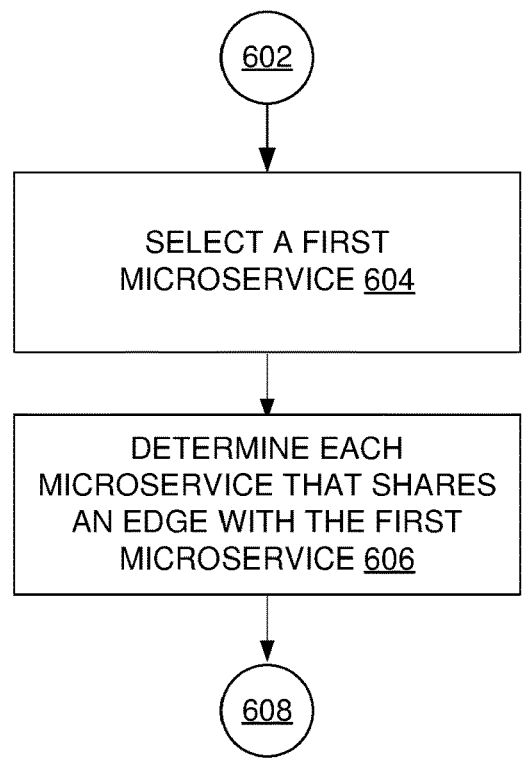
FIG. 6 illustrates an example process flow for determining neighbors of a microservice that can facilitate chaos engineering based on a service mesh and an organizational chart, in accordance with certain embodiments of this disclosure.
Figure 7:
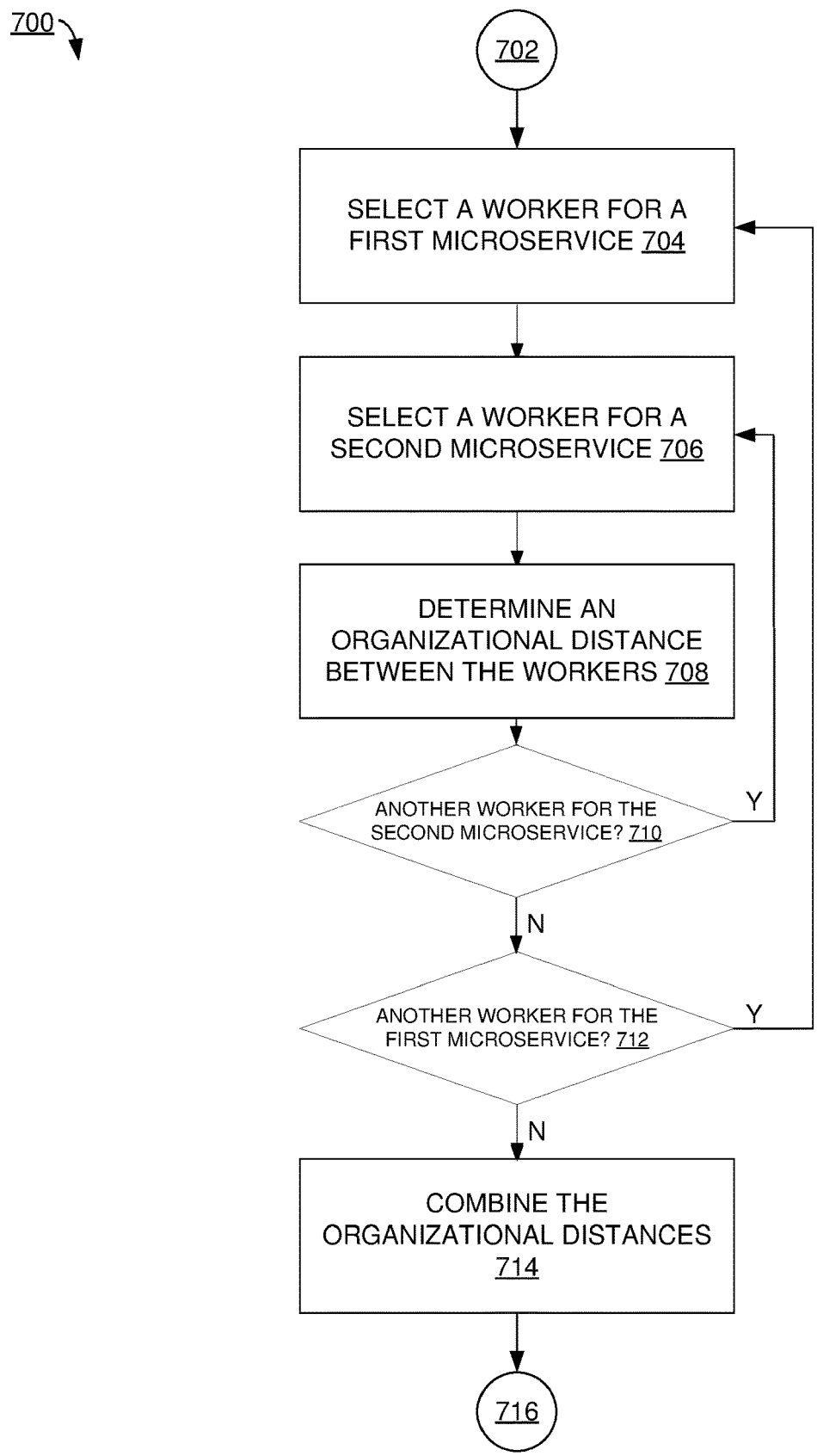
FIG. 7 illustrates an example process flow for analyzing pairs of workers in microservice neighbors that can facilitate chaos engineering based on a service mesh and an organizational chart, in accordance with certain embodiments of this disclosure.
Figure 8:
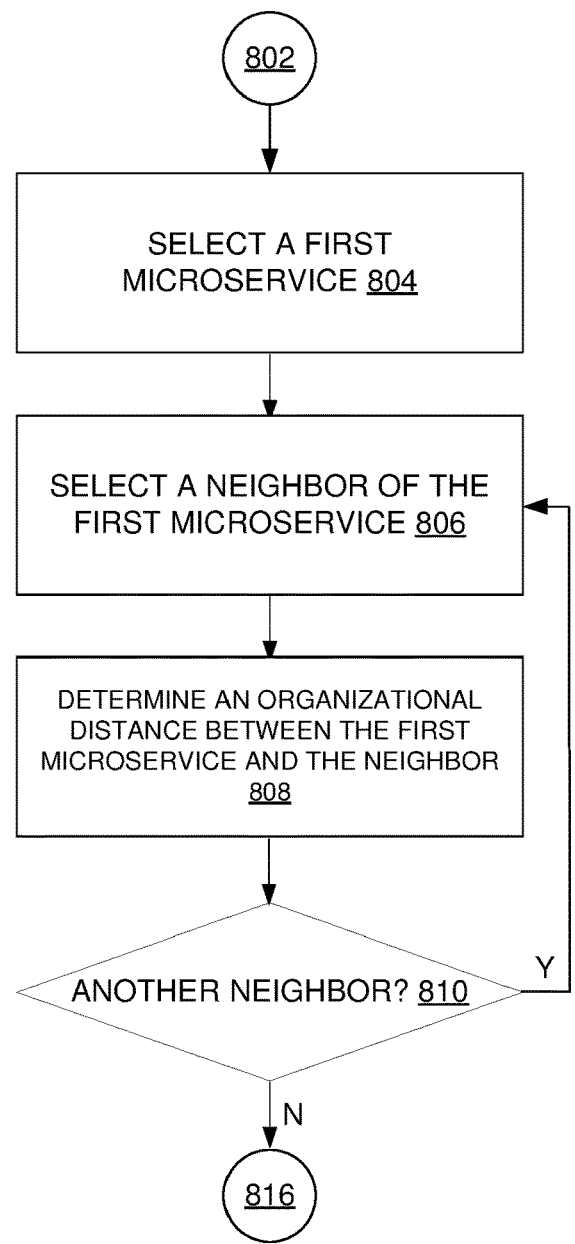
FIG. 8 illustrates an example process flow for analyzing each of a microservice's neighbors that can facilitate chaos engineering based on a service mesh and an organizational chart, in accordance with certain embodiments of this disclosure.
Figure 9:
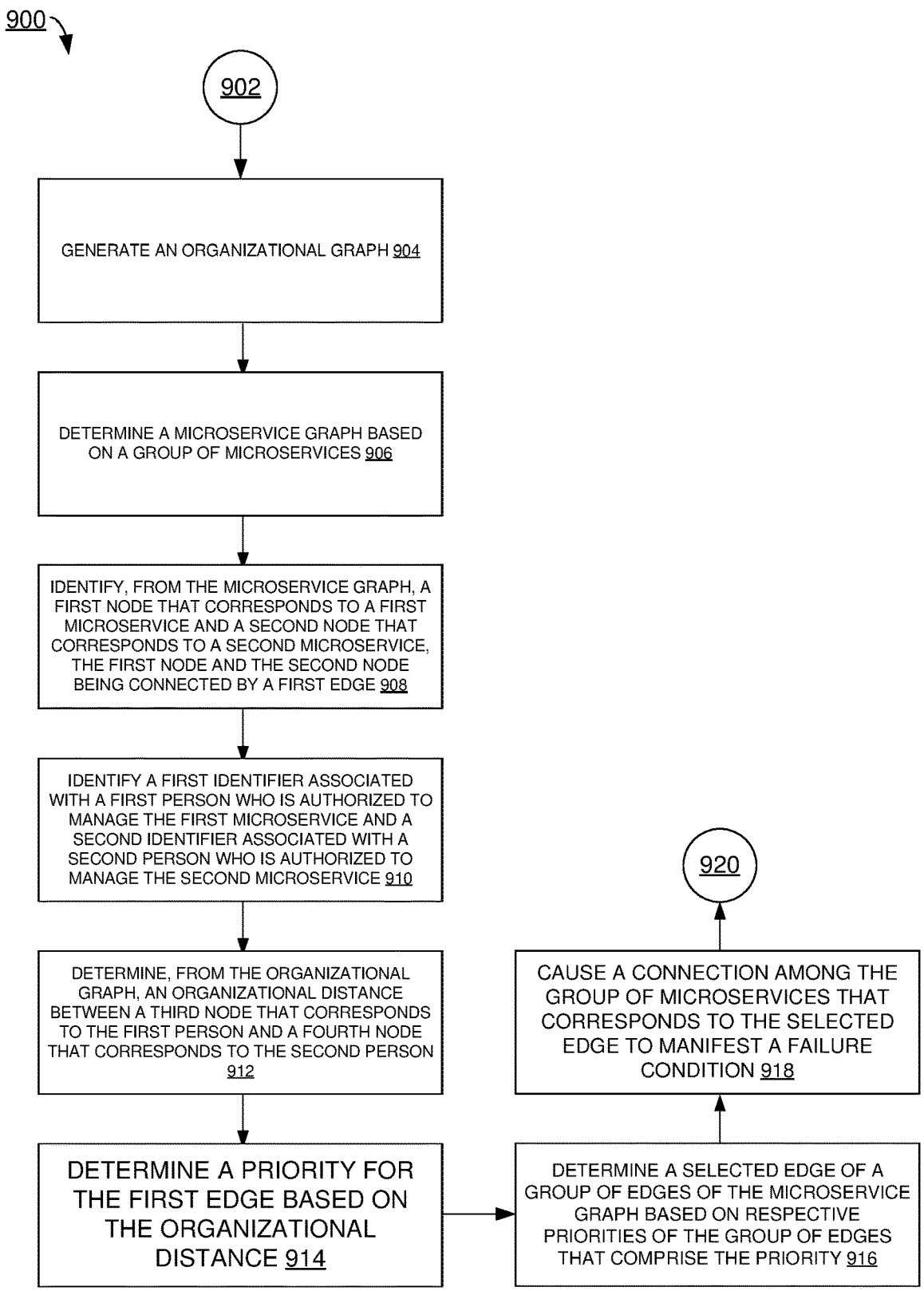
FIG. 9 illustrates an example process flow for chaos engineering based on a service mesh and an organizational chart, in accordance with certain embodiments of this disclosure.
Figure 10:
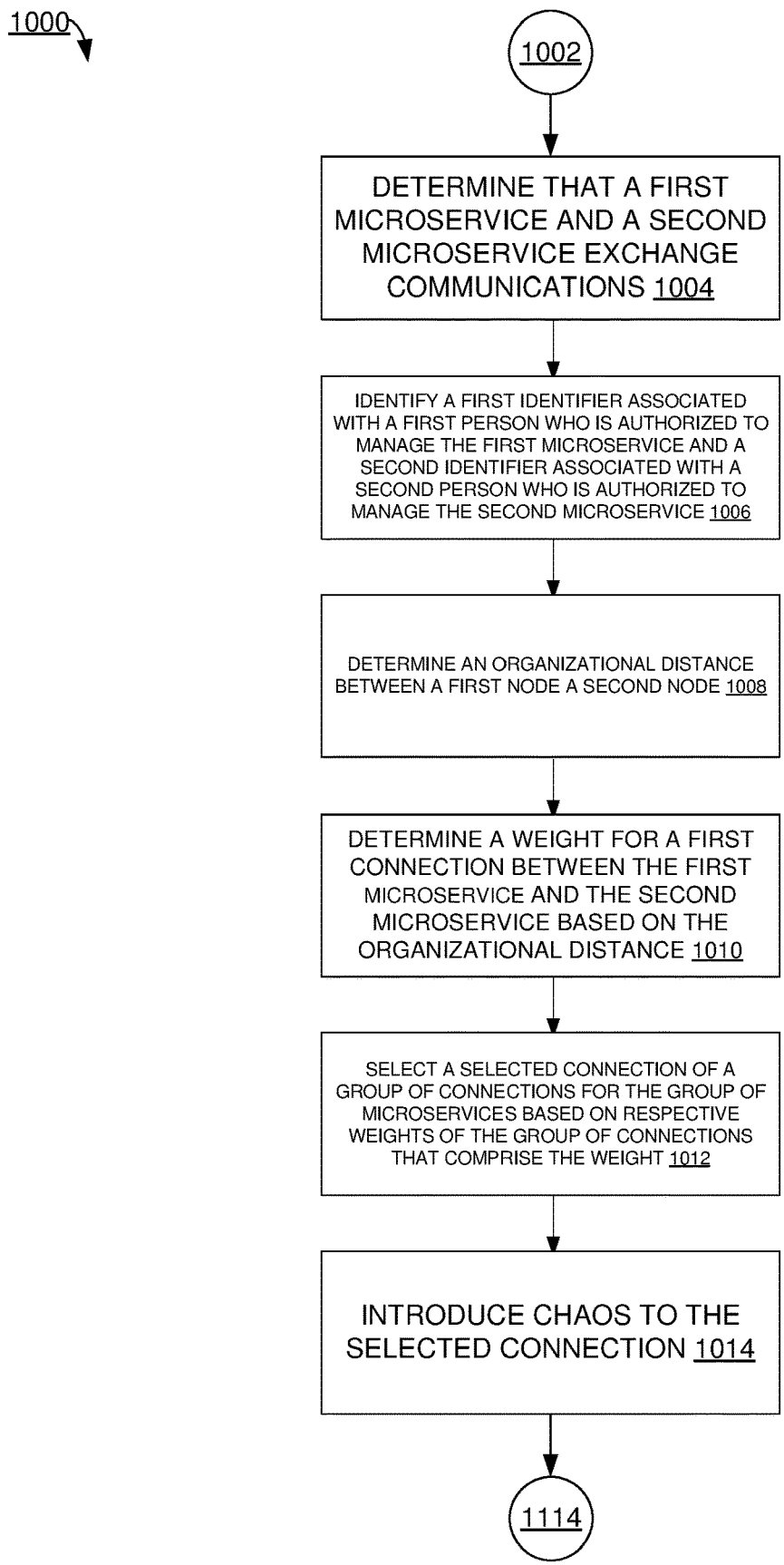
FIG. 10 illustrates another example process flow for chaos engineering based on a service mesh and an organizational chart, in accordance with certain embodiments of this disclosure.
Figure 11:
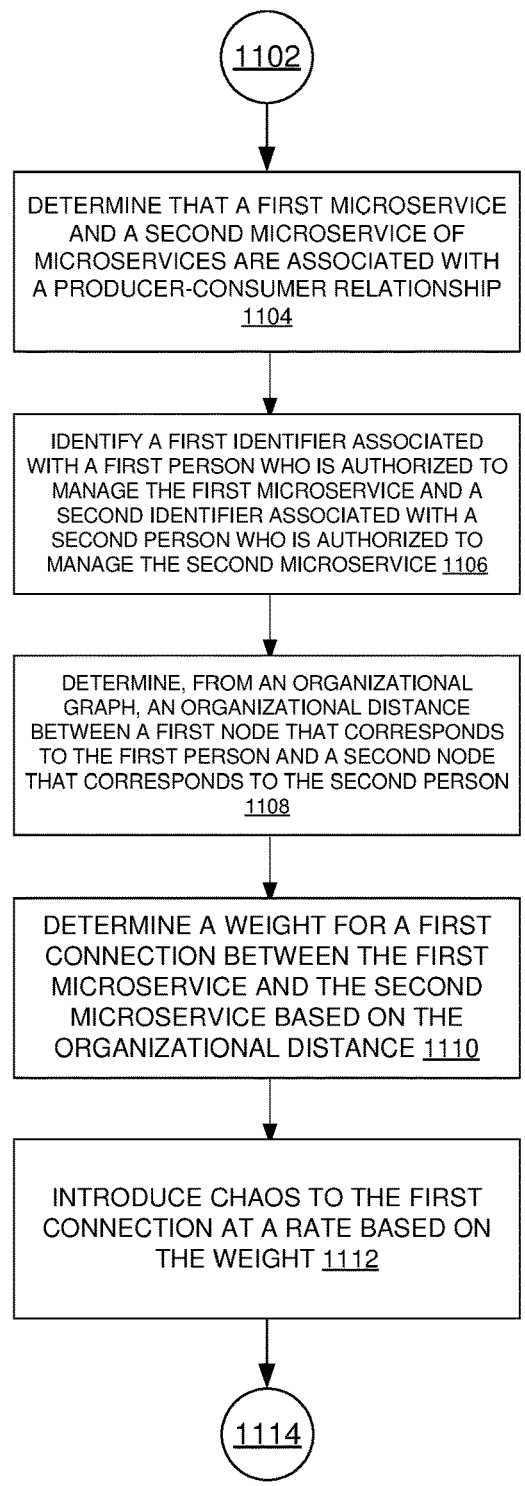
FIG. 11 illustrates another example process flow for chaos engineering based on a service mesh and an organizational chart, in accordance with certain embodiments of this disclosure.

In implementing data driven chaos engineering based on a service mesh and an organizational chart in this manner, organization-based probabilistic chaos component 108 can implement part(s) of process flow 600 of FIG. 6, process flow 700 of FIG. 7, process flow 800 of FIG. 8, process flow 900 of FIG. 9, process flow 1000 of FIG. 10, and/or process flow 1100 of FIG. 11.

Figure 2:
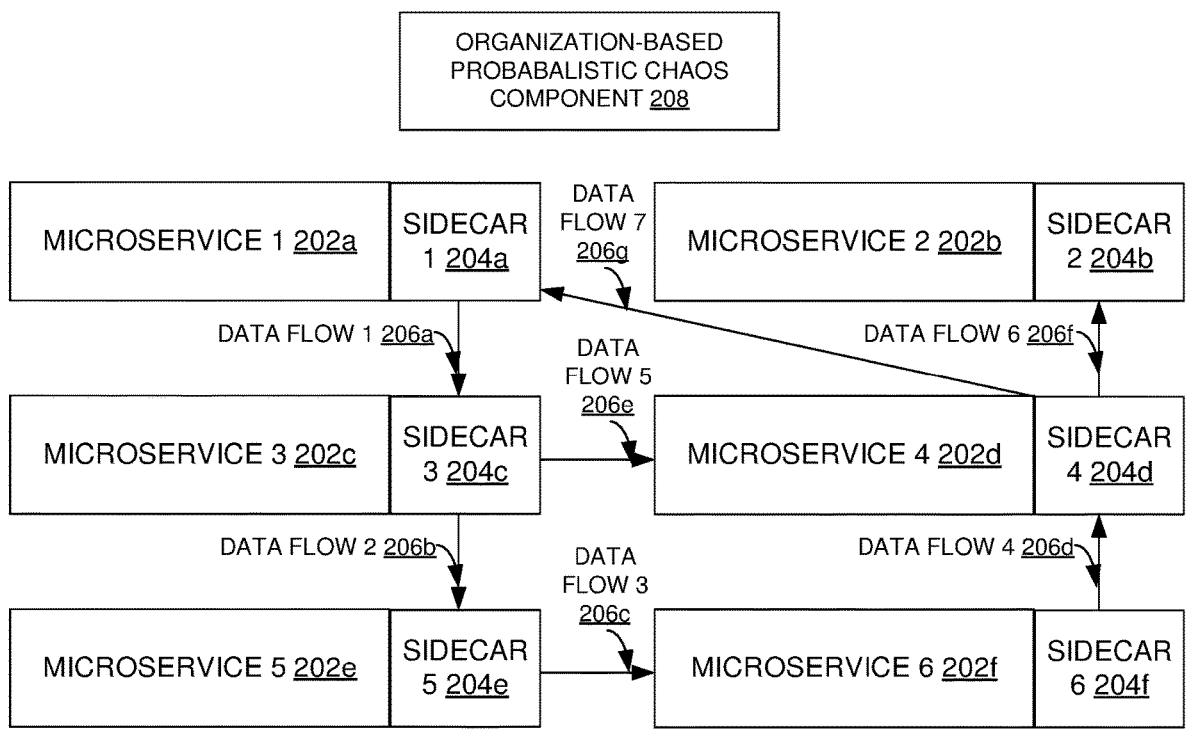
FIG. 2 illustrates an example system architecture of microservices that can facilitate chaos engineering based on a service mesh and an organizational chart, in accordance with certain embodiments of this disclosure.

FIG. 2 illustrates an example system architecture 200 of microservices that can facilitate chaos engineering based on a service mesh and an organizational chart, in accordance with certain embodiments of this disclosure. In some examples, system architecture 200 can be similar to a system architecture of microservice 1 110*a*, microservice 2 110*b*, and microservice 3 110*c* of FIG. 1, and can be controlled by organization-based probabilistic chaos component 208

(which can be similar to organization-based probabilistic chaos component 108 of FIG. 1).

In some examples, the microservices can be connected via a service mesh. In some examples, a service mesh does not introduce new functionality into an application's runtime environment because the application already has rules to specify how requests get from point A to point B. A service mesh can differ from a traditional application in that a service mesh can take logic governing service-to-service communication out of individual services, and abstract it to a layer of infrastructure.

In a service mesh, requests can be routed between microservices through proxies in their own infrastructure layer. Individual proxies that make up a service mesh can be referred to as "sidecars," since they can run alongside each service, rather than within a service. Taken together, these sidecar proxies—decoupled from their respective services—can form a mesh network.

In some examples, where a service mesh is created, any logic (via microservices) can be added to the proxy.

As depicted, system architecture 200 comprises microservice 1 202a, microservice 2 202b, microservice 3 202c, microservice 4 202d, microservice 5 202e, and microservice 6 202f. As depicted, system architecture 200 also comprises sidecar 1 204a (which corresponds to microservice 1 202a), sidecar 2 204b (which corresponds to microservice 2 202b), sidecar 3 204c (which corresponds to microservice 3 202c), sidecar 4 204d (which corresponds to microservice 4 202d), sidecar 5 204e (which corresponds to microservice 5 202e), and sidecar 6 204f (which corresponds to microservice 6 202f). This collection of microservices and sidecars can collectively be considered a service mesh, and can collectively operate as a SaaS product.

As depicted there are also data flows in system architecture 200. These data flows can be used by microservices to communicate, and be made using the microservices corresponding sidecars. As depicted, there are data flow 1 206a, data flow 2 206b, data flow 3 206c, data flow 4 206d, data flow 5 206e, data flow 6 206f, and data flow 7 206g.

Data flow 1 206a is from microservice 1 202a and to microservice 3 202c (via sidecar 1 204a and sidecar 3 204c, respectively). Regarding data flow 1 206a, microservice 1 202a can be said to be the producer, and microservice 202b can be said to be the consumer. Data flow 2 206b is from microservice 3 202c and to microservice 5 202e. Data flow 3 206c is from microservice 5 202e and to microservice 6 202f. Data flow 4 206d is from microservice 6 202f and to microservice 4 202d. Data flow 5 206e is from microservice 3 202c and to microservice 4 202d. Data flow 6 206f is from microservice 4 202d and to microservice 2 202b. Data flow 7 206g is from microservice 4 202d and to microservice 1 202a.

Figure 3:
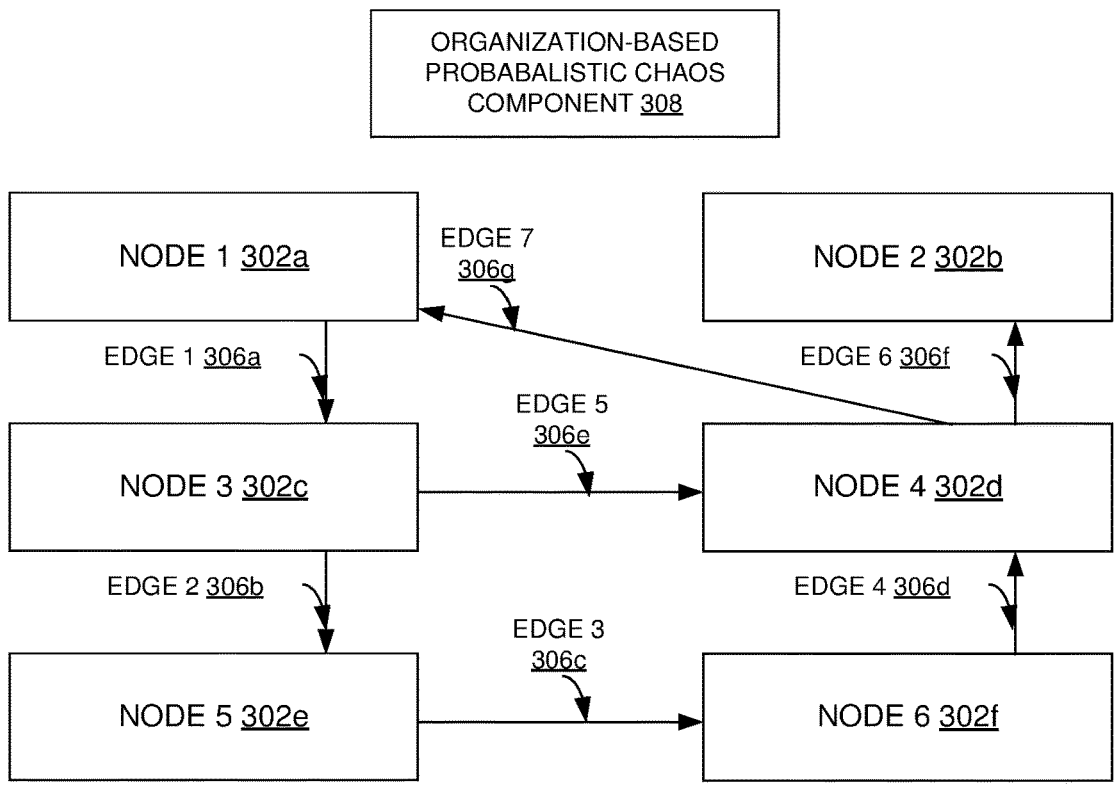
FIG. 3 illustrates an example service mesh graph from a plurality of microservices that can facilitate chaos engineering based on a service mesh and an organizational chart, in accordance with certain embodiments of this disclosure.

In some examples, system architecture 200 can be used to automatically create an service mesh graph, such as service mesh graph 300 of FIG. 3. Organization-based probabilistic chaos component 208 can create this service mesh graph from system architecture 200.

FIG. 3 illustrates an example service mesh graph 300 formed from a plurality of microservices that can facilitate chaos engineering in microservices using a service mesh, in accordance with certain embodiments of this disclosure. In some examples, organization-based probabilistic chaos component 308 (which can be similar to organization-based probabilistic chaos component 108 of FIG. 1) can generate example service mesh graph 300 from system architecture 200 of FIG. 2. That is, a structure of service mesh graph 300 can be deducted by generating a service mesh between the different microservices of system architecture 200 of FIG. 2. Service mesh graph 300 comprises a plurality of nodes and edges that connect the nodes. This can be distinguished from, for example, a graph where values are plotted in two-dimensional coordinate system.

In an example, a graph of the microservices can be generated based on a structure of API dependencies between the microservices. An approach to generating such an API graph can be utilize tools that adapt a service mesh. A service mesh can describe a network of microservices that make up a distributed application, and interactions between these microservices. As a service mesh grows in size and complexity, it can become harder to understand and manage. There can be tools that allow control over a service mesh, and provide behavioral insights and operational insights over the service mesh as a whole.

A central service can be provided that the proxies can send data to, such as organization-based probabilistic chaos component 308. For example, a first proxy (e.g., sidecar 1 204a of FIG. 2) associated with a first microservice (such as microservice 1 202a of FIG. 2) can relay a call (such as data 206-1) that the first microservice sends to a second microservice (such as microservice 3 202c of FIG. 2) associated with a second proxy (such as sidecar 3 204c of FIG. 2), and this data can also be sent to the central service. The central service can collect this data over time to generate an API graph.

By generating a graph, the central service can form a representation of a network structure. In a graph, a directed edge (u, v) can represent a scenario where microservice v consumes an API from microservice u. Put another way, microservice v can be a consumer and microservice u can be a producer in this relationship. In examples, u and v in the graph can be referred to as nodes of the graph.

An importance of nodes in the graph can be established. In some examples, each pair of nodes can be assigned a value to represent a probability that chaos will be introduced in a connection between the two microservices represented by the pair of nodes. This probability can be based on an organizational distance between workers responsible for each microservice, where an organizational distance is described with respect to FIG. 5.

As depicted, service mesh graph 300 is composed of six nodes, which each correspond to a microservice of system architecture 200 of FIG. 2. That is, service mesh graph 300 comprises node 1 302a (corresponding to microservice 1 202a of FIG. 2), node 2 302b (corresponding to microservice 2 202b of FIG. 2), node 3 302c (corresponding to microservice 3 202c of FIG. 2), node 4 302d (corresponding to microservice 4 202d of FIG. 2), node 5 302e (corresponding to microservice 5 202e of FIG. 2), and node 6 302f (corresponding to microservice 6 202f of FIG. 2).

Service mesh graph 300 also comprises a plurality of directed edges between nodes, and these directed edges can correspond to data flow in system architecture 200. Service mesh graph 300 comprises directed edge 1 306a (which corresponds to data flow 1 206a of FIG. 2), directed edge 2 306b (which corresponds to data flow 2 206b of FIG. 2), directed edge 3 306c (which corresponds to data flow 3 206c of FIG. 2), directed edge 4 306d (which corresponds to data flow 4 206d of FIG. 2), directed edge 5 306e (which corresponds to data flow 5 206e of FIG. 2), and directed edge 6 306f (which corresponds to data flow 6 206f of FIG. 2).

From Service mesh graph 300, organization-based probabilistic chaos component 308 can determine neighboring microservices of a given microservice. Organization-based probabilistic chaos component 308 can use these neighboring microservices to determine where to introduce chaos in a microservices architecture.

Figure 4:
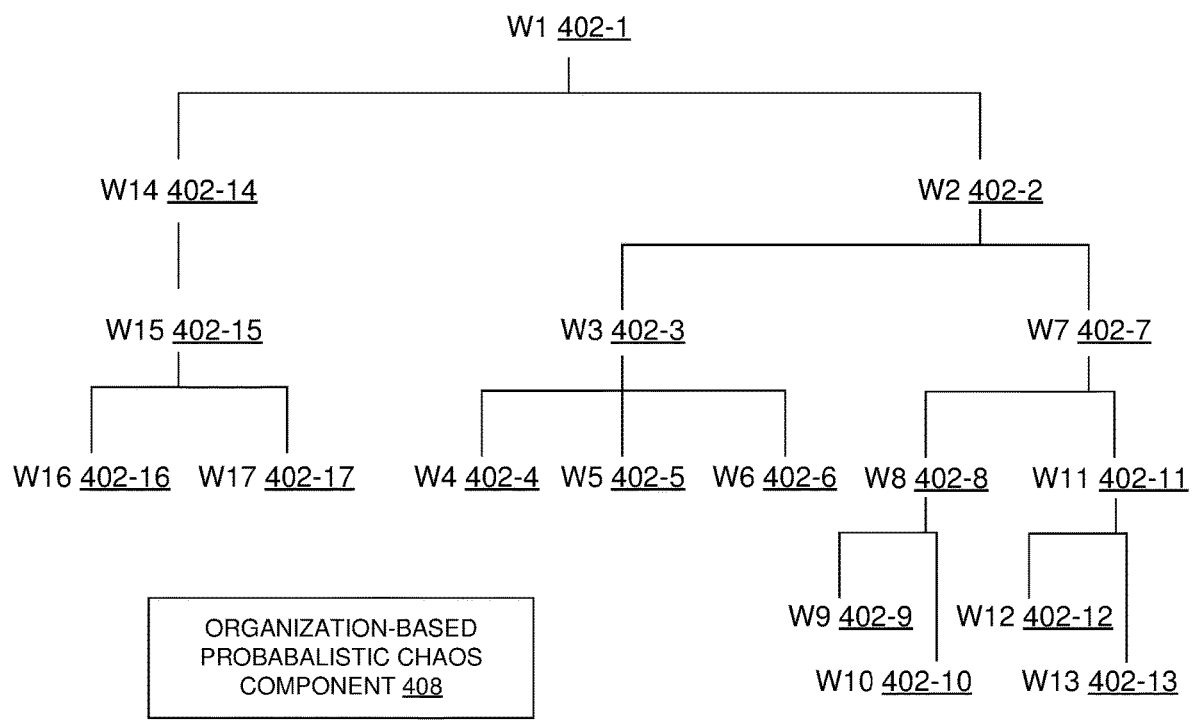
FIG. 4 illustrates an example organizational graph that can facilitate chaos engineering based on a service mesh and an organizational chart, in accordance with certain embodiments of this disclosure.

FIG. 4 illustrates an example organizational graph 400 that can facilitate data-driven organization adjustment, in accordance with certain embodiments of this disclosure. In some examples, organizational graph 400 can be generated by organization-based probabilistic chaos component 404 (which can be similar to organization-based probabilistic chaos component 108 of FIG. 1) using information accessed from organization database 112 of FIG. 1.

As depicted, there are 17 workers in organizational graph 400—W1 402-1, W2 402-2, W3 402-3, W4 402-4, W5 402-5, W6 402-6, W7 402-7, W8 402-8, W9 402-9, W10 402-10, W11 402-11, W12 402-12, W13 402-13, W14 402-14, W15 402-15, W16 402-16, and W17 402-17.

Organizational graph 400 illustrates reporting relationships between workers—which workers report to which other workers, or which workers have which workers reporting to them. As depicted, W9 402-9 and W10 402-10 report to W8 402-8; W12 402-12 and W13 402-13 report to W11 402-11; W16 402-16 and W17 402-17 report to W15 402-15; W4 402-4, W5 402-5, and W6 402-6 report to W3 402-3; W8 402-8 and W11 402-11 report to W7 402-7; W15 402-15 reports to W14 402-14; W3 402-3 and W7 402-7 report to W2 402-2; W14 402-14 and W2 402-2 report to W1 402-1; and W1 402-1 reports to no one.

The nomenclature Mset(X)={Y} can be used, where X identifies a particular worker, and Y identifies any microservices that worker X manages. Y can be a null set, can be one microservice, or can be multiple microservices. For example, MSet(W3)={MS1} indicates that worker W3 manages microservice MS1.

Then, the various Msets of organizational graph 400 can be, Mset(W1)={ }, Mset(W2)={ }, Mset(W3)={MS1}, Mset(W4)={MS5}, Mset(W5)={MS1}, Mset(W6)={MS1}, Mset(W7)={ }, Mset(W8)={MS2}, Mset(W9)={MS5}, Mset(W10)={MS2}, Mset(W11)={MS3}, Mset(W12)={MS5}, Mset(W13)={MS3}, Mset(W14)={ }, Mset(W15)={MS4}, Mset(W16)={MS4}, and Mset(W17)={MS4}.

The nomenclature Wset(X)={Y} can be used, where X identifies a particular microservice, and Y identifies any workers that manage microservice X. Y can be a null set, can be one microservice, or can be multiple microservices. For example, Wset(MS1)={W3, W5, W6} indicates that microservice MS1 is managed by workers W3, W5, and W6.

Then, the various Wsets of organizational graph 400 can be, Wset(MS1)={W3, W5, W6}, Wset(MS2)={W8, W10}, Wset(MS3)={W11, W13}, Wset(MS4)={W15, W16, W17}, and Wset(MS5)={W4, W9, W12}.

The nomenclature for fragile weight, FW(X,Y)=Z can be used, where X and Y each identify a microservice, and Z identifies a combined organizational distance between those two microservices. For example, FW(MS1, MS2)=3 indicates that microservice MS1 and microservice MS2 have a combined organizational distance of 3.

The various FWs of organizational graph 400 can be, FW(MS1, MS3)=avg(3,4,4,5,4,5)=25/6=4.16; FW(MS3, MS2)=avg(2,3,3,4)=12/4=3; FW(MS3, MS4)=avg(5,6,6,7, 6,7)=37/6=6.16; FW(MS2, MS5)=avg(4,1,3,5,2,4)=19/6=3.16; and FW(MS4, MS5)=avg(5,6,6,6,7,7,6,7,7)=57/9=6.33.

These microservice pairs can be organized into a fragile edge list, from highest combined organizational distance to lowest as such: ((MS4, MS5), (MS3, MS4), (MS1, MS3), (MS2, MS5), (MS3, MS2)). And normalizing their respective FW scores results in (0.28, 0.27, 0.18, 0.14, 0.13). This indicates, for instance that either (MS4, MS5) or (MS3, MS4) will be chosen more than half the times, while the other edges will be chosen the remaining times.

Figure 5:
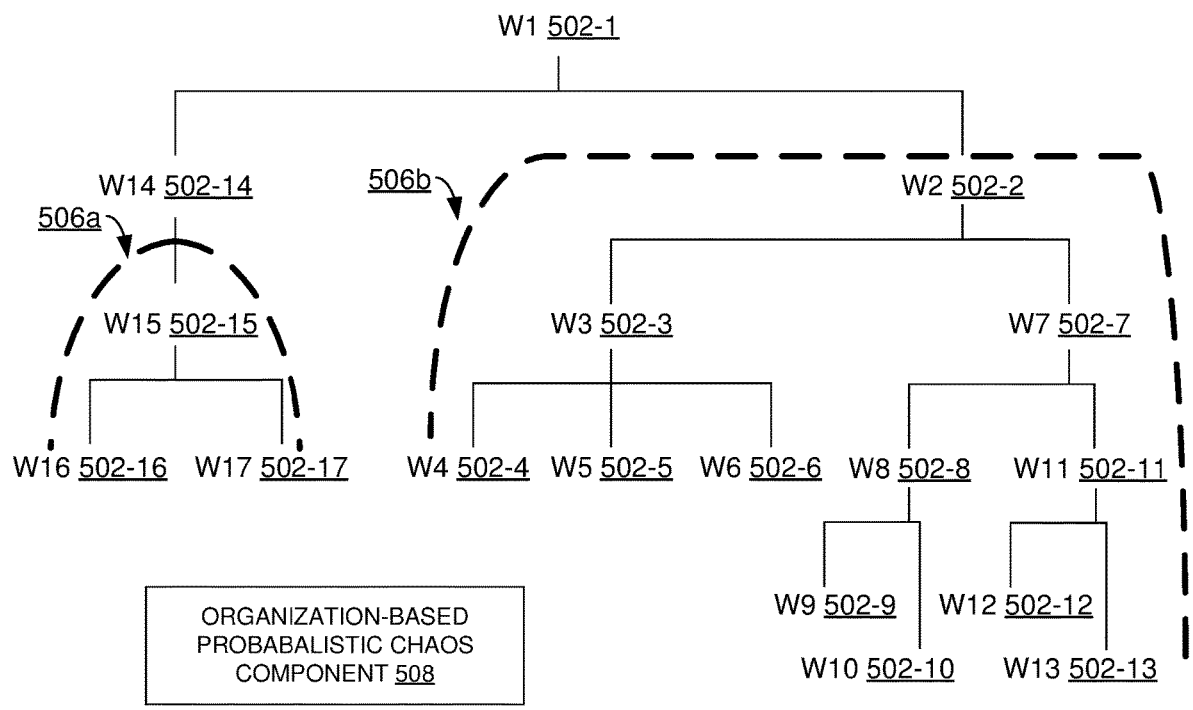
FIG. 5 illustrates an example of an organizational distance in an organizational graph that can facilitate chaos engineering based on a service mesh and an organizational chart, in accordance with certain embodiments of this disclosure.

FIG. 5 illustrates an example of an organizational distance in an organizational graph 500 that can facilitate chaos engineering based on a service mesh and an organizational chart, in accordance with certain embodiments of this disclosure;

As depicted, there are 17 workers in organizational graph 500—W1 502-1, W2 502-2, W3 502-3, W4 502-4, W5 502-5, W6 502-6, W7 502-7, W8 502-8, W9 502-9, W10 502-10, W11 502-11, W12 502-12, W13 502-13, W14 502-14, W15 502-15, W16 502-16, and W17 502-17. These workers can correspond to workers in organizational graph 400—respectively, W1 402-1, W2 402-2, W3 402-3, W4 402-4, W5 402-5, W6 402-6, W7 402-7, W8 402-8, W9 402-9, W10 402-10, W11 402-11, W12 402-12, W13 402-13, W14 402-14, W15 402-15, W16 402-16, and W17 402-17.

In some examples, organization-based probabilistic chaos component 504 (which can be similar to organization-based probabilistic chaos component 108 of FIG. 1) can determine an organizational distance between two workers. An organizational distance can represent a shortest path between two workers represented in an organizational path.

For example, organization-based probabilistic chaos component 504 can determine organizational distance 506a and organizational distance 506b. Organizational distance 506a can represent an organizational distance between W16 502-16 and W17 502-17, and can be equal to 2. The shortest path between W16 502-16 and W17 502-17 goes through one more worker—W15 502-15. So, starting from W16 502-16, the path travels to two more workers—W15 502-15 and then the destination of W17 502-17. Traveling to two workers to reach the destination along the shortest path indicates that the organizational distance is 2.

Then, organizational distance 506b can represent an organizational distance between W4 502-4 and W13 502-13, and can be equal to 5. The shortest path between W4 502-4 and W13 502-13 goes through four intervening workers—W3 502-3, W2 502-2, W7 502-7, and W11 502-11—and then to a fifth worker, the destination W13 502-13.

It can be determined that a large organizational distance between two workers means that those workers are unlikely to be in close contact, and so connections between their respective microservices are more fragile and difficult to repair. Based on this rationale, when introducing chaos to a microservices architecture, organization-based probabilistic chaos component 504 can increase the probability of introducing chaos to connections between microservices that are managed by workers with a large organizational distance.

Example Process Flows

FIG. 6 illustrates an example process flow 600 for determining neighbors of a microservice that can facilitate chaos engineering based on a service mesh and an organizational chart, in accordance with certain embodiments of this disclosure. In some examples, one or more embodiments of process flow 600 can be implemented by organization-based probabilistic chaos component 108 of FIG. 1, or computing environment 1200 of FIG. 12.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, process flow 1000 of FIG. 10, and/or process flow 1100 of FIG. 11.

Process flow 600 begins with 602, and moves to operation 604. Operation 604 depicts selecting a first microservice. In some examples, selecting a first microservice can maintain selecting a microservice from a service mesh graph of microservices. In other examples, a list of microservices can be maintained (such as based on the service mesh graph), and the first microservice can be selected from this list of microservices.

After operation 604, process flow 600 moves to operation 606.

Operation 606 depicts determining each microservice that shares an edge with the first microservice. In some examples, edges are maintained as pairs of microservices. That is, an edge between microservice 1 (MS1) and microservice 2 (MS2) can be maintained as the pair (MS1, MS2).

In such examples, determining the first microservice's neighbors—e.g., each microservice that shares an edge with the first microservices—can comprise analyzing each of these microservice pairs for those that identify microservice 1, and then identifying the other microservice in a given pair as a microservice that shares an edge with the first microservice. That is, using the example pair (MS1, MS2), it can be determined that microservice 1 is identified in the pair, and then that the other microservice identified in the pair—microservice 2—is a microservice that shares an edge with microservice 1.

After operation 606, process flow 600 moves to 608, where process flow 600 ends. In some examples, process flow 600 can be performed for each microservice represented in a given service mesh graph to determine each microservice's neighboring microservices.

FIG. 7 illustrates an example process flow 700 for analyzing pairs of workers in microservice neighbors that can facilitate chaos engineering based on a service mesh and an organizational chart, in accordance with certain embodiments of this disclosure. In some examples, one or more embodiments of process flow 700 can be implemented by organization-based probabilistic chaos component 108 of FIG. 1, or computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with embodiment(s) of one or more of process flow 600 of FIG. 6, process flow 800 of FIG. 8, process flow 900 of FIG. 9, process flow 1000 of FIG. 10, and/or process flow 1100 of FIG. 11.

Process flow 700 begins with 702, and moves to operation 704. Operation 704 depicts selecting a worker for a first microservice. In some examples, each microservice that a worker has ownership of can be determined from information stored in repository 114 of FIG. 1. This information can be used to determine, for a given worker what microservices that worker is responsible. Likewise, this information can be used to determine, for a given microservice, what workers are responsible for that microservice.

In some examples, in operation 704, selecting a worker for a microservice can comprise selecting a worker that is responsible for the microservice and that has not yet been selected for this instance of process flow 700.

The worker selected for the first microservice in operation 704 and the worker selected for the second microservice in operation 706 can comprise pairs of workers for neighboring microservices. In some examples, process flow 700 can be implemented to enumerate and examine each such pair combination. After operation 704, process flow 700 moves to operation 706.

Operation 706 depicts selecting a worker for a second microservice. In some examples, operation 706 can be implemented in a similar manner as operation 704. After operation 706, process flow 700 moves to operation 708.

Operation 708 depicts determining an organizational distance between the workers. In some examples, this organizational distance can be similar to the example organizational distances of organizational graph 500 of FIG. 5. Determining an organizational distance can comprise traversing an organizational graph between the node that corresponds to one of the workers of the pair being evaluated and the other of the workers of the pair being evaluated. After operation 708, process flow 700 moves to operation 710.

Operation 710 depicts determining whether there is another worker for the second microservice. In some examples, this can comprise determining whether there is a worker responsible for the second microservice that has yet to be evaluated relative to the worker of the first microservice from operation 704.

Where it is determined in operation 710 that there is another worker for the second microservice, process flow 700 returns to operation 706. In this manner, loops of operations 706-710 can be performed to determine a respective organizational distance between the selected worker for the first microservice and each worker of the second microservice.

Instead, where it is determined in operation 710 that there is not another worker for the second microservice, process flow 700 moves to operation 712.

Operation 712 is reached from operation 710 where it is determined that there is not another worker for the second microservice. Operation 712 depicts determining whether there is another worker for the first microservice. In some examples, operation 712 can be implemented in a similar manner as operation 710, and used to evaluate each worker that corresponds to the first microservice within an instance of process flow 700.

Where it is determined in operation 712 that there is another worker for the first microservice, process flow 700 returns to operation 704. In this manner, loops of operations 704-712 can be performed to determine a respective organizational distance between each worker for the first microservice and each worker of the second microservice.

Instead, where it is determined in operation 712 that there is not another worker for the first microservice, process flow 700 moves to operation 714.

Operation 714 is reached from operation 712 where it is determined that there is not another worker for the first microservice. Operation 714 depicts combining the organizational distances. In some examples, this comprises using the greatest organizational distance for the organizational distance between the first microservice and the second microservice. In some examples, this comprises taking an average organizational distance. Other combinations of organizational distances between a worker of the first microservice and a worker of the second microservice can be implemented.

This combined organizational distance can be used to determine a probability for implementing chaos between the first microservice and the second microservice as part of chaos testing. In some examples, a larger combined organizational distance can indicate a higher probability that chaos will be introduced at this point in the microservices architecture. After operation 714, process flow 700 moves to operation 716, where process flow 700 ends.

FIG. 8 illustrates an example process flow 800 for analyzing each of a microservice's neighbors that can facilitate chaos engineering based on a service mesh and an organizational chart, in accordance with certain embodiments of this disclosure. In some examples, one or more embodiments of process flow 800 can be implemented by organization-based probabilistic chaos component 108 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with embodiment(s) of one or more of process flow 600 of FIG. 6, process flow 700 of FIG. 7, process flow 900 of FIG. 9, process flow 1000 of FIG. 10, and/or process flow 1100 of FIG. 11.

Process flow 800 begins with 802, and moves to operation 804. Operation 804 depicts selecting a first microservice. In some examples, process flow 800 is used to evaluate a given microservice relative to each of that microservice's neighbors. In such examples, operation 804 can comprise selecting the first microservice such that each microservice is evaluated with an instance of process flow 800. After operation 804, process flow 800 moves to operation 806.

Operation 806 depicts selecting a neighbor of the first microservice. In examples where a service mesh graph represents edges as pairs of microservices—e.g., the (MS1, MS2) example above, operation 806 can comprise evaluating the service mesh graph for pairs that identify the first microservice, and then determining that the other microservice in that pair is a neighboring microservice.

Operation 806 can comprise selecting one of these neighboring microservices. After operation 806, process flow 800 moves to operation 808.

Operation 808 depicts determining an organizational distance between the first microservice and the neighbor. In some examples, operation 808 can be implemented with an instance of process flow 700 of FIG. 7, where the combined organizational distance of operation 714 is used as the organizational distance in operation 808. After operation 808, process flow 800 moves to operation 810.

Operation 810 depicts determining whether the first microservice has another neighbor. This can comprise determining whether each of the first microservice's neighbors (as discussed with respect to operation 806) have been evaluated during the present iteration of process flow 800. Where one of the first microservice's neighbors has not been evaluated during the present iteration of process flow 800, it can be determined in operation 810 that the first microservice does have another neighbor.

Where it is determined in operation 810 that the first microservice has another neighbor, process flow 800 returns to operation 806. In this manner, loops of operations 806-810 can be performed to organizational distances between the first microservice and each of its neighbors.

Instead, where it is determined in operation 810 that the first microservice does not have another neighbor, process flow 800 moves to 812, where process flow 800 ends.

FIG. 9 illustrates an example process flow 900 for chaos engineering based on a service mesh and an organizational chart, in accordance with certain embodiments of this disclosure. In some examples, one or more embodiments of process flow 900 can be implemented by organization-based probabilistic chaos component 108 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with embodiment(s) of one or more of process flow 600 of FIG. 6, process flow 700 of FIG. 7, process flow 800 of FIG. 8, process flow 1000 of FIG. 10, and/or process flow 1100 of FIG. 11.

Process flow 900 begins with 902, and moves to operation 904. Operation 904 depicts generating an organizational graph, a node of the organizational graph representing a person of an organization that produces a group of microservices, and an edge of the organizational graph representing an organizational relationship between two people of the organization. That is, an organizational graph can be created.

In some examples, generating the organizational graph comprises receiving, by querying a database, chart data representative of an organizational chart of people identifiers representative of people in the organization that create the group of microservices, the chart data indicating a manager to whom the person reports. That is, organization-based probabilistic chaos component 108 of FIG. 1 can query organization database 112 for information about workers of the organization, and use this information to generate a corresponding organizational graph.

In some examples, the organizational distance between the third node and the fourth node comprises a shortest undirected path between the third node and the fourth node in the organizational graph. That is, an organizational distance for two workers can be a shortest undirected path between two nodes (that each correspond to one of the workers worker) in the organizational graph.

After operation 904, process flow 900 moves to operation 906.

Operation 906 depicts determining a microservice graph based on the group of microservices, a node of the microservice graph representing a microservice of the group of microservices, and an edge of the microservice graph representing a communication between two microservices of the group of microservices. That is, a service mesh graph can be created.

In some examples, determining the microservice graph is performed by a component that is separate from the group of microservices, wherein the group of microservices sends information about data transfer between microservices of the group of microservices to the component, and wherein the component identifies the first node of the microservice graph as a source of the data transfer between the microservices, and identifies the second node of the microservice graph as a destination of the data transfer between the microservices. That is, a component such as organization-based probabilistic chaos component 108 of FIG. 1 can monitor data transfer between the microservices, and use this data transfer to determine the service mesh graph of the microservices.

In some examples, determining the microservice graph comprises analyzing the first microservice of the group of microservices to determine what other microservices of the group of microservices to which the microservice is configured to send data. That is, computer-executable instructions of the first microservice can be analyzed to determine what other microservices the first microservice exchanges data with, and this information can be used to determine the service mesh graph of the microservices.

After operation 906, process flow 900 moves to operation 908.

Operation 908 depicts identifying, from the microservice graph, a first node that corresponds to a first microservice and a second node that corresponds to a second microservice, the first node and the second node being connected by a first edge. That is, two connected nodes in the service mesh graph can be selected for analysis.

After operation 908, process flow 900 moves to operation 910.

Operation 910 depicts identifying a first identifier associated with a first person who is authorized to manage the first microservice and a second identifier associated with a second person who is authorized to manage the second microservice. That is, one person for each of the two selected nodes can be selected.

After operation 910, process flow 900 moves to operation 912.

Operation 912 depicts determining, from the organizational graph, an organizational distance between a third node that corresponds to the first person and a fourth node that corresponds to the second person. That is, the organizational distance of the two people from operation 910 can be determined based on the organizational graph.

After operation 912, process flow 900 moves to operation 914.

Operation 914 depicts determining a priority for the first edge based on the organizational distance. That is, an organizational distance can be used as a priority value for an edge (for determining whether to apply chaos to that edge of the edges of a microservice system architecture).

In some examples, the priority for the first edge is based on an aggregated priority of respective organizational distances corresponding to pairs of people between the two microservices, a pair comprising one person who is authorized to manage the first microservice and another person who is authorized to manage the second microservice. That is, the priority can be an average organizational distance of all workers pairs between two microservices that are neighbors.

In some examples, the priority for the first edge is normalized relative to the respective priorities of the group of microservices, and wherein the selecting of the selected microservice is based on normalized priorities of the group of microservices. That is, an edge's priority can be normalized. For instance, where priorities correspond to probabilities of being selected for chaos testing during a given iteration, the priorities can be normalized to sum to 100%.

After operation 914, process flow 900 moves to operation 916.

Operation 916 depicts selecting a selected edge of a group of edges of the microservice graph based on respective priorities of the group of edges that comprise the priority. That is, when edges are assigned priorities based on organizational distances of the corresponding workers of corresponding microservices, these priorities can then be used to determine where to introduce chaos.

After operation 916, process flow 900 moves to operation 918.

Operation 918 depicts causing a connection among the group of microservices that corresponds to the selected edge to manifest a failure condition. This failure condition can comprise, for example, disabling a communications pathway between two microservices.

After operation 918, process flow 900 moves to 920, where process flow 900 ends.

FIG. 10 illustrates another example process flow 1000 for chaos engineering based on a service mesh and an organizational chart, in accordance with certain embodiments of this disclosure. In some examples, one or more embodiments of process flow 1000 can be implemented by organization-based probabilistic chaos component 108 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with embodiment(s) of one or more of process flow 600 of FIG. 6, process flow 700 of FIG. 7, process flow 800 of FIG. 8, process flow 900 of FIG. 9, and/or process flow 1100 of FIG. 11.

Process flow 1000 begins with 1002, and moves to operation 1004. Operation 1004 depicts determining that a first microservice and a second microservice exchange communications. In some examples, this determination can be based on a service mesh graph for the first and second microservices, and implemented in a similar manner as operation 906 of FIG. 6.

After operation 1004, process flow 1000 moves to operation 1006.

Operation 1006 depicts identifying a first identifier associated with a first person who is authorized to manage the first microservice and a second identifier associated with a second person who is authorized to manage the second microservice. In some examples, operation 1006 can be implemented in a similar manner as operations 908-910 of FIG. 9.

After operation 1006, process flow 1000 moves to operation 1008.

Operation 1008 depicts determining an organizational distance between a first node that corresponds to the first person and a second node that corresponds to the second person, wherein a node of the organizational graph represents a person of an organization that produces a group of microservices that comprises the first microservice and the second microservice, and wherein an edge of the organizational graph represents an organizational relationship between two people of the organization. In some examples, operation 1008 can be implemented in a similar manner as operation 912 of FIG. 9.

After operation 1008, process flow 1000 moves to operation 1010.

Operation 1010 depicts determining a weight for a first connection between the first microservice and the second microservice based on the organizational distance. In some examples, operation 1010 can be implemented in a similar manner as operation 914 of FIG. 9.

In some examples, the weight for the first connection is based on an combined weight of respective organizational distances of people who are authorized to manage the first microservice and people who are authorized to manage the second microservice (in the parlance of a service mesh graph, the two nodes that an edge connects). That is, a connection's priority can be based on all the workers in the connected microservices. This combined weight can be determined in various ways. In some examples, the combined weight can be an average weight. In some examples, the combined weight can be a summed weight. In some examples, the combined weight can be a median weight.

In some examples, operation 1010 comprises determining that a second connection of the group of connections has been assigned a weight of zero, increasing the weight of the second connection to a value above zero. That is, a weight of zero can indicate that there is no chance of chaos being introduced to a particular connection. In such examples, so as to fully test all connections, a connection that would otherwise be assigned a weight of zero can instead be assigned a small positive weight so that that connection does have a small chance of being selected for chaos testing.

After operation 1010, process flow 1000 moves to operation 1012.

Operation 1012 depicts selecting a selected connection of a group of connections for the group of microservices based on respective weights of the group of connections that comprise the weight. In some examples, operation 1012 can be implemented in a similar manner as operation 916 of FIG. 9.

After operation 1012, process flow 1000 moves to operation 1014.

Operation 1014 depicts introducing chaos to the selected connection. In some examples, this comprises causing a failure of the connection. In some examples, operation 1014 can be implemented in a similar manner as operation 918 of FIG. 9.

After operation 1014, process flow 1000 moves to 1016, where process flow 1000 ends.

FIG. 11 illustrates another example process flow 1100 for chaos engineering based on a service mesh and an organizational chart, in accordance with certain embodiments of this disclosure. In some examples, one or more embodiments of process flow 1100 can be implemented by organization-based probabilistic chaos component 108 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with embodiment(s) of one or more of process flow 600 of FIG. 6, process flow 700 of FIG. 7, process flow 800 of FIG. 8, process flow 900 of FIG. 9, and/or process flow 1000 of FIG. 10.

Process flow 1100 begins with 1102, and moves to operation 1104. Operation 1104 depicts determining that a first microservice and a second microservice of microservices are associated with a producer-consumer relationship. In some examples, operation 1104 can be implemented in a similar manner as operation 908 of FIG. 9.

After operation 1104, process flow 1100 moves to operation 1106.

Operation 1106 depicts identifying a first identifier associated with a first person who is authorized to manage the first microservice and a second identifier associated with a second person who is authorized to manage the second microservice. In some examples, operation 1106 can be implemented in a similar manner as operation 910 of FIG. 9.

After operation 1106, process flow 1100 moves to operation 1108.

Operation 1108 depicts determining, from an organizational graph that represent people of an organization that produces the microservices that comprises the first microservice and the second microservice, an organizational distance between a first node that corresponds to the first person and a second node that corresponds to the second person. In some examples, operation 1108 can be implemented in a similar manner as operation 912 of FIG. 9.

In some examples, the organizational distance between two nodes of the organizational graph comprises a shortest undirected path between the two nodes.

After operation 1108, process flow 1100 moves to operation 1110.

Operation 1110 depicts determining a weight for a first connection between the first microservice and the second microservice based on the organizational distance. In some examples, operation 1110 can be implemented in a similar manner as operation 914 of FIG. 9. In some examples, the weight of the first connection indicates a probability that the first connection will be selected among the connections for inducing the chaos.

After operation 1110, process flow 1100 moves to operation 1112.

Operation 1112 depicts introducing chaos to the first connection at a rate based on the weight. In some examples, operation 1112s can be implemented in a similar manner as operation 916-918 of FIG. 9.

In some examples, operation 1112 comprises selecting the first connection for the chaos based on the first microservice having a largest weight of the connection. For instances, in examples where there is not a lot of time for introducing chaos, a connection with the largest weight can be selected.

In some examples, operation 1112 comprises initiating a failure of the first connection, and performing a chaos test on the microservices. That is, chaos testing can comprise causing a failure in the system, and then seeing how the system responds to the failure—e.g., whether the system is able to route around the failure, whether the system is not functional due to the failure, or whether the system is functional but in a diminished performance state due to the failure.

In some examples, operation 1112 comprises, in response to determining that less than a threshold amount of time has elapsed, selecting another connection of connections of the microservices for inducing the chaos based on the respective weights to the connections. That is, there can be a set amount of time to introduce chaos in a given round of chaos testing (such as maintained by a timer), and where there is still time after introducing chaos at a first point, chaos can then be introduced at a second point (and a third point, etc.).

After operation 1112, process flow 1100 moves to 1114, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of client computer 102, microservices SaaS platform 106, organization-based probabilistic chaos component 108, microservice 1 110*a*, microservice 2 110*b*, and microservice 3 110*c* of FIG. 1, organization database 112, and/or repository 114. In some examples, computing environment 1200 can implement one or more embodiments of the process flows of FIGS. 6-11 to facilitate data driven chaos engineering based on a service mesh and an organizational chart.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, a computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   determining, by a system comprising a processor, that a first microservice and a second microservice exchange communications;
   determining, by the system and from an organizational graph, an organizational distance between a first organizational node that corresponds to the first microservice and a second organizational node that corresponds to the second microservice, wherein a node of the organizational graph represents a person of an organization that produces a group of microservices that comprises the first microservice and the second microservice, and wherein an edge of the organizational graph represents an organizational relationship between two people of the organization, wherein the determining of the organizational distance between the first organizational node that corresponds to the first microservice node and the second organizational node that corresponds to the second microservice node is performed in response to identifying a first identifier associated with a first person who is authorized to manage the first microservice and a second identifier associated with a second person who is authorized to manage the second microservice;

selecting, by the system, a selected connection of a group of connections for the group of microservices based on respective weights of the group of connections that comprise the weight, wherein the selecting of the selected connection of the group of connections of the microservice graph based on the respective weights of the group of connections that comprise the weight is performed in response to determining a weight for manifesting a failure condition in a connection between the first microservice and the second microservice based on the organizational distance between the first organizational node and the second organizational node; and introducing, by the system, chaos to the selected connection.

2. The method of claim 1, wherein the weight for the first connection is based on an combined weight of respective organizational distances of people who are authorized to manage the first microservice and people who are authorized to manage the second microservice.

3. The method of claim 2, wherein the combined weight is an average weight.

4. The method of claim 2, wherein the combined weight is a summed weight.

5. The method of claim 2, wherein the combined weight is a median weight.

6. The method of claim 1, further comprising:
determining, by the system, that a second connection of the group of connections has been assigned a weight of zero; and
increasing the weight of the second connection to a value above zero.

7. The method of claim 1, wherein the introducing of the chaos to the selected connection comprises:
causing, by the system, a failure of the selected connection.

8. A system, comprising:
a processor; and
a memory that stores executable instructions that, when executed by the processor, facilitate performance of operations, comprising:
generating an organizational graph, a node of the organizational graph representing a person of an organization that produces a group of microservices, and an edge of the organizational graph representing an organizational relationship between two people of the organization;
determining a microservice graph based on the group of microservices, a node of the microservice graph representing a microservice of the group of microservices, and an edge of the microservice graph representing a communication between two microservices of the group of microservices;

identifying, from the microservice graph, a first microservice node that corresponds to a first microservice and a second microservice node that corresponds to a second microservice, the first microservice node and the second microservice node being connected by a first edge;

determining, from the organizational graph, an organizational distance between a first organizational node that corresponds to the first microservice node and a second organizational node that corresponds to the second microservice node, wherein the determining of the organizational distance between the first organizational node that corresponds to the first microservice node and the second organizational node that corresponds to the second microservice node is performed in response to identifying a first identifier associated with a first person who is authorized to manage the first microservice and a second identifier associated with a second person who is authorized to manage the second microservice;

selecting a selected edge of a group of edges of the microservice graph based on respective priorities of the group of edges that comprise the priority, wherein the selecting of the selected edge of the group of edges of the microservice graph based on respective priorities of the group of edges that comprise the priority is performed in response to determining a priority for manifesting a failure condition in a connection between the first microservice and the second microservice based on the organizational distance between the first organizational node and the second organizational node; and causing a connection among the group of microservices that corresponds to the selected edge to manifest a failure condition.

9. The system of claim 8, wherein the organizational distance between the first organizational node and the second organizational node comprises a shortest undirected path between the first organizational node and the second organizational node in the organizational graph.

10. The system of claim 8, wherein the priority for the first edge is based on an aggregated priority of respective organizational distances corresponding to pairs of people, a pair comprising one person who is authorized to manage the first microservice and another person who is authorized to manage the second microservice.

11. The system of claim 8, wherein the priority for the first edge is normalized relative to the respective priorities of the group of edges, and wherein the selecting of the selected edge is based on normalized priorities of the group of edges.

12. The system of claim 8, wherein the determining of the microservice graph is performed by a component that is separate from the group of microservices, wherein the group of microservices sends information about data transfer between microservices of the group of microservices to the component, and wherein the component identifies the first microservice node of the microservice graph as a source of the data transfer between the microservices, and identifies the second microservice node of the microservice graph as a destination of the data transfer between the microservices.

13. The system of claim 8, wherein the determining of the microservice graph comprises:
analyzing the first microservice of the group of microservices to determine what other microservices of the group of microservices to which the microservice is configured to send data.

14. The system of claim 8, wherein the generating of the organizational graph comprises:
receiving, by querying a database, chart data representative of an organizational chart of people identifiers representative of people in the organization that create the group of microservices, the chart data indicating a manager to whom the person reports.

15. The system of claim 8, wherein the organizational distance between two nodes of the organizational graph comprises a shortest undirected path between the two nodes.

16. A non-transitory computer-readable medium comprising instructions that, in response to execution, cause a system comprising a processor to perform operations, comprising:
determining that a first microservice and a second microservice of microservices are associated with a producer-consumer relationship;
determining, from an organizational graph that represent people of an organization that produces the microservices that comprises the first microservice and the second microservice, an organizational distance between a first node that corresponds to the first microservice and a second organizational node that corresponds to the second microservice, wherein the determining of the organizational distance between the first organizational node that corresponds to the first microservice node and the second organizational node that corresponds to the second microservice node is performed in response to identifying a first identifier associated with a first person who is authorized to manage the first microservice and a second identifier associated with a second person who is authorized to manage the second microservice;
determining a weight for manifesting a failure condition in a first connection between the first microservice and the second microservice based on the organizational distance between the first organizational node and the second organizational node; and
introducing chaos to the first connection at a rate based on the weight.

17. The non-transitory computer-readable medium of claim 16, wherein the operations further comprise:
selecting the first connection for the chaos based on the first microservice having a largest weight of connections of the microservices.

18. The non-transitory computer-readable medium of claim 16, wherein the operations further comprise:
initiating a failure of the first connection; and
performing a chaos test on the microservices.

19. The non-transitory computer-readable medium of claim 16, wherein the operations further comprise:
in response to determining that less than a threshold amount of time has elapsed, selecting a second connection of connections of the microservices for inducing the chaos based on respective weights to the connections.

20. The non-transitory computer-readable medium of claim 16, wherein the weight of the first connection indicates a probability that the first connection will be selected among connections of the microservices for inducing the chaos.

* * * * *